United States Patent [19]
Kawamura

[11] Patent Number: 5,715,787
[45] Date of Patent: Feb. 10, 1998

[54] INTERNAL-COMBUSTION ENGINE HAVING A PRE-COMBUSTION CHAMBER

[75] Inventor: Hideo Kawamura, Kanagawa, Japan

[73] Assignee: Isuzu Ceramics Research Institute Co., Ltd, Kanagawa, Japan

[21] Appl. No.: 550,991

[22] Filed: Oct. 31, 1995

[51] Int. Cl.⁶ .................................... F02F 3/26
[52] U.S. Cl. .......................................... 123/276
[58] Field of Search ............... 123/276, 254, 123/260, 271, 279

[56] References Cited

U.S. PATENT DOCUMENTS

| | | | |
|---|---|---|---|
| 4,667,630 | 5/1987 | Sasaki | 123/276 |
| 4,669,433 | 6/1987 | Hoppie et al. | 123/276 |
| 5,483,933 | 1/1996 | Kawamura | 123/254 |

FOREIGN PATENT DOCUMENTS

| | | | |
|---|---|---|---|
| 420642 | 4/1991 | European Pat. Off. | 123/276 |
| 598605 | 5/1994 | European Pat. Off. | 123/276 |
| 675273 | 10/1995 | European Pat. Off. | 123/276 |
| 2380422 | 9/1978 | France | 123/276 |
| 2621076 | 3/1989 | France | 123/276 |
| 3538633 | 4/1986 | Germany | 123/276 |

OTHER PUBLICATIONS

Patent Abstracts of Japan, vol. 18, No. 660 (M–1722), Dec. 14, 1994 & JP–A–06 257441 (Isuzu), Sep. 13, 1994.
Patent Abstracts of Japan, vol. 950, No. 002 & JP–A–07 042562 (Isuzu Ceramics Kenkyusho:KK), Feb. 10, 1995.
Patent Abstracts of Japan, vol. 10, No. 270 (M–517) [2326], Sep. 13, 1986 & JP–A–61 093227 (Mazda), May 12, 1986.
Patent Abstracts of Japan, vol. 11, No. 105 (M–577), Apr. 3, 1987 & JP–A–61 252826 (Mazda), Nov. 10, 1986.
Patent Abstracts of Japan, vol. 11, No. 160 (M–592), May 23, 1987 & JP–A–61 294119 (NGK), Dec. 24, 1986.

Primary Examiner—Raymond A. Nelli
Attorney, Agent, or Firm—Staas & Halsey

[57] ABSTRACT

To provide an improved heat insulating structure in which the movement of air in the air space of a heat insulating layer is permitted as small as possible thus giving a higher heat shielding effect. A heat insulating layer of an air space is provided between a center tube and an external heat shielding tube in a fuel injection nozzle and a carbon getter is disposed at an interface between the heat insulating layer and a combustion chamber. When a combustion gas moves into the carbon getter, its carbon components are trapped and accumulated thus blocking between the heat insulating layer and the combustion chamber. As the heat insulating layer is isolated, its inside air remains stagnate increasing the heat shielding effect. This srtacture has been appied to the pre-combustion chamber.

10 Claims, 3 Drawing Sheets

INTERNAL-COMBUSTION ENGINE HAVING A PRE-COMBUSTION CHAMBER

BACKGROUND OF THE INVENTION

1. Field of the Invention

The present invention relates to an internal-combustion engine having a pre-combustion chamber and more particularly, to an internal-combustion engine having a pre-combustion chamber with a heat insulation member.

2. Description of the Prior Art

In recent years, there has been developed a system for an internal-combustion engine having a heat insulated combustion chamber, pre-combustion chamber, exhaust pipe which consist of high toughness ceramic. And this engine has no engine cooling system. The above mentioned heat insulated pre-combustion chamber will now be further explained. The pre-combustion chamber has a heat insulating air layer between an outside of the pro-combustion chamber and the engine body. The air layer insulates the heat from the pre-combustion chamber when the temperature of the layer is the same as the air outside, but the temperature of the air layer increases to the temperature of pre-combustion chamber and air pressure in the air layer increases. At this point, the air layer does not insulate the heat from pre-combustion chamber. That is to say, the coefficient of heat-transfer for the gas in the air layer changes as a function of viscosity, temperature and pressure of the gas. The coefficient of heat-transfer ($\alpha$ g) for a combustion-hot gas is 116 W/m$^2$, and the coefficient of heat-transfer ($\alpha$ g) for normal air is 580 W/m$^2$. Therefore, the air layer of the prior art does not insulate heat in the pre-combustion chamber when the temperature of the air layer increases. In addition, the air layer's temperature increases from gas leaking from combustion chamber, and heat insulation of the pre-combustion chamber is further decreased.

SUMMARY OF THE INVENTION

Accordingly, an object of the present invention is to provide an internal-combustion engine having a pre-combustion chamber with a heat insulation member, without air movement in an air layer between the combustion chamber and the engine body during engine operation.

The inventor found that when movement of air in the air layer is stopped, higher heat-insulation is achieved.

According to the present invention, there is provided an internal-combustion engine having a pre-combustion chamber with a heat insulation member and a fuel injection nozzle near the pre-combustion chamber comprising: a heat insulation layer between the pre-combustion chamber and a member outside of the pre-combustion chamber: a carbon trapper arranged at an entrance of said heat insulation layer made from a permeable material such that carbon particles permeate into said permeable material and close the entrance of said heat insulation layer.

According to the present invention, there is provided an internal-combustion engine having a pre-combustion chamber with a heat insulation member and a fuel injection nozzle near the pre-combustion chamber comprising: a heat insulation layer made from an air gap between a main combustion chamber, a pre-combustion chamber and outside walls. A carbon trapper is arranged in an entrance of combustion gas to said heat insulation layer, the trapper being made from a permeable material such that carbon particles permeate into said permeable material and close said entrance of said heat insulation layer.

According to the present invention, there is provided an internal-combustion engine having a pre-combustion chamber with a heat insulation member and a fuel injection nozzle near the pre-combustion chamber comprising: a heat insulation layer made from an air gap and insulating materials, between a main combustion chamber, a pre-combustion chamber and outside walls; a carbon trapper arranged in an entrance for combustion gas to the said heat insulation layer made from a permeable material such that carbon particles permeate into said permeable material and close said entrance of said heat insulation layer.

According to the present invention, there is provided an internal-combustion engine having a pre-combustion chamber heat insulation member and a fuel injection nozzle near the pre-combustion chamber comprising: a heat insulation layer made from an air gap between a central cylinder and a heat insulating cylinder of a fuel injection nozzle; a carbon trapper arranged in an entrance for combustion gas to the heat insulation layer made from a permeable material such that carbon particles permeate into said permeable material and close said entrance of said heat insulation layer.

According to the present invention, there is provided an internal-combustion engine having a pre-combustion chamber with a heat insulating member and a fuel injection nozzle near the pre-combustion chamber comprising: a heat insulation layer made from an air gap and a heat insulating material between a central cylinder and heat insulating cylinder of fuel injection nozzle; a carbon trapper arranged in an entrance for combustion gas to the heat insulation layer, made from a permeable material such that carbon particles permeate into said permeable material and close said entrance of said heat insulation layer.

According to the present invention, there is provided an internal-combustion engine having a pre-combustion chamber with a heat insulation member and a fuel injection nozzle near the pre-combustion chamber comprising: a heat insulation layer made from an air gap and insulating materials, between a main combustion chamber, a pre-combustion chamber and outside walls; a carbon trapper arranged in an entrance for combustion gas to the heat insulation layer, made from a permeable material such that carbon particles permeate into said permeable material and close said entrance of said heat insulation layer; a fuel injection nozzle projecting from a center of the cylinder head to the combustion chamber; a piston having said pre-combustion chamber embedded by said heat insulation layer in the top thereof; and a pre-combustion chamber having a center opening provided therein for accepting said fuel injection nozzle.

According to the present invention, there is provided an internal-combustion engine having a pre-combustion chamber with a heat insulation member and a fuel injection nozzle near the pre-combustion chamber comprising: a heat insulation layer made from an air gap and insulating material, between a main combustion chamber, a pre-combustion chamber and outside walls; a carbon trapper arranged in an entrance for combustion gas to the heat insulation layer, made from a permeable materials such that carbon particles permeate into said permeable material and close said entrance of said heat insulation layer; a fuel injection nozzle projecting from a center of the cylinder head to the combustion chamber; a piston having said pre-combustion chamber embedded by said heat insulation layer in the top thereof; a pre-combustion chamber having a center opening provided therein for accepting said fuel injection nozzle: and a plurality of radial gas through holes in said pre-combustion chamber extending at their upper opening ends to the inner wall of the cylinder liner.

Small carbon particles produced by combustion from the combustion engine will be trapped by the material of the carbon trapper, small holes in the carbon trapper will fill with the trapped carbon particles. Then, the high temperature gas from combustion chamber will not leak to the air layer between pre-combustion chamber and the engine body and hence heat insulation will be improved. Further, small carbon particles trapped by carbon trapper do not soak into deep portions of carbon trapper and instead trapped carbon particles form a heat insulation wall on the surface of carbon trapper. This fact is ascertained by experimentation of the inventor. The effect of heat insulation will be further improved.

DESCRIPTION OF THE PREFERRED EMBODIMENT(S)

Figure 1:
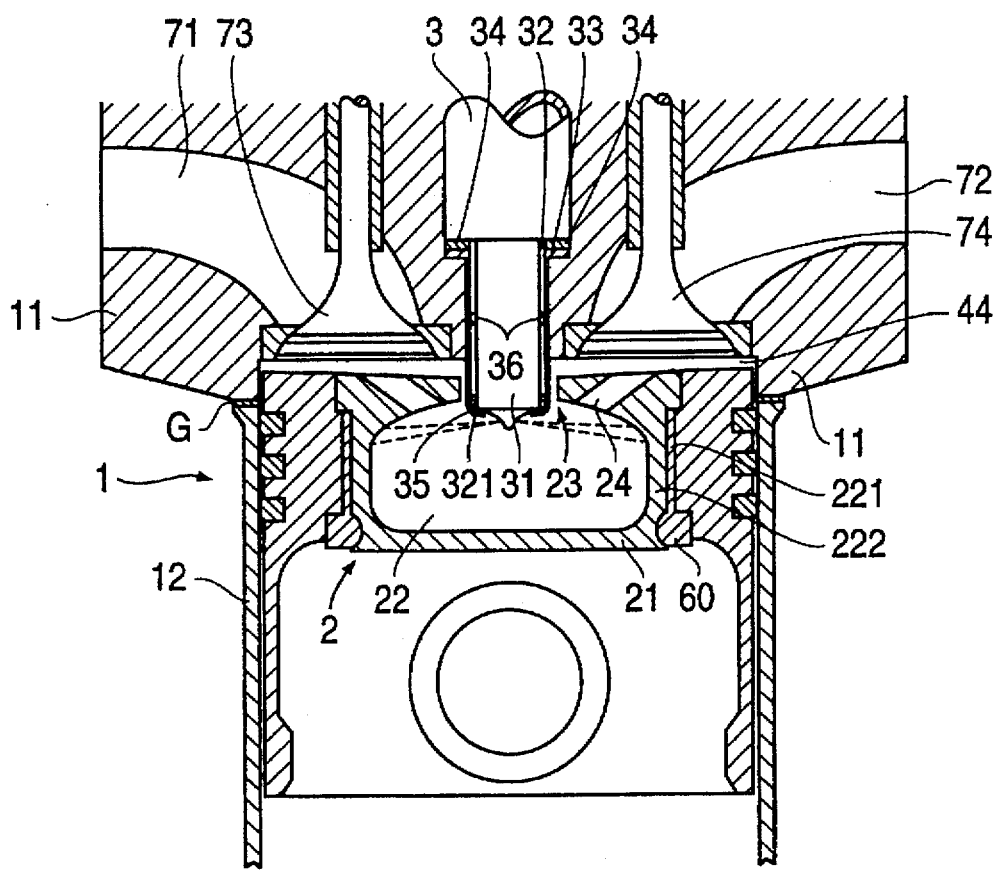
FIG. 1 is a cross section view of the pre-combustion chamber of the first embodiment of the present invention.
Figure 3:
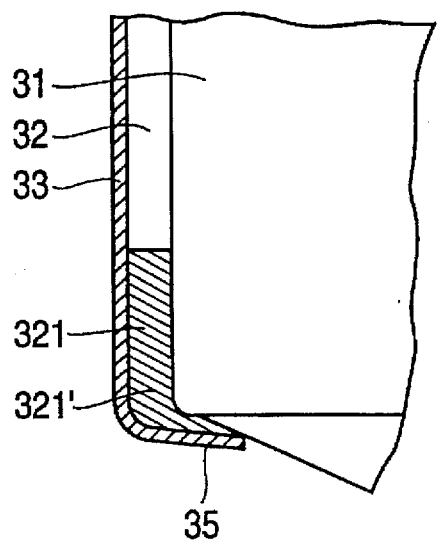
FIG. 3 is an enlarged cross section view of the another top portion of injection nozzle.
Figure 2:
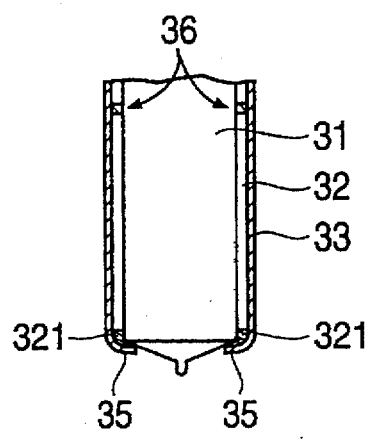
FIG. 2 is an enlarged cross section view of a top portion of injection nozzle.

Preferred embodiments of the present invention will be described in more detail. FIG. 1 is a cross section view of the pre-combustion chamber of the first embodiment of the present invention. FIG. 2 is an enlarged cross section view of a top portion of the fuel injection nozzle of the present invention. As shown in FIG. 1 and FIG. 2, numeral 1 denotes an internal combustion engine and numeral 11 denotes the cylinder head of the internal combustion engine 1. Lower side of the cylinder head 11 has a cylinder liner 12, and there is a cylinder head gasket G airtightly between the cylinder head 11 and the cylinder liner 12.

Numeral 2 denotes a piston which is slidably fitted in the cylinder liner 12, the rubbed part of the piston has a piston ring 43. A pre-combustion chamber 21 made from high durability ceramics is provided at an upper center portion of the piston 2. A central through hole 23 through which the fuel injection nozzle passes when the piston is positioned in the upper dead center point, is provided in the upper wall of the pre-combustion chamber 21. Radially passing gas through holes 24 are provided around the periphery of the central through hole 23. The pre-combustion chamber 21 is fixed to the piston 2 by a fixed ring 60. Numeral 22 denotes the combustion space.

Numeral 3 denotes the fuel injection nozzle. The fuel injection nozzle 3 will inject the fuel to the pre-combustion chamber 21 just before the piston 2 arrives at the dead center point. For the purpose of preventing a temperature rise, a central cylinder 31 of the fuel injection nozzle 3, which includes a needle and a fuel path, has a heat insulating layer 32 composed of an air gap between the central cylinder 31 and a heat insulating cylinder 33 made from metal. The surface of the heat insulating cylinder 33 is coated with zirconia ceramics. The top of the heat insulating cylinder 33 is fixed to the fuel injection nozzle 3 by a gasket made from familiarized material among the fuel injection nozzle 3 and heat insulating cylinder. A tip of the central cylinder 31 contacts a tip 35 of the heat insulating cylinder 33. A permeable carbon trapper 321 made from a pressed fiber of silicon carbide is provided at the lower part of the heat insulating layer 32. Numeral 36 denotes spacer 36. Numerals 71 and 72 denote respectively an inlet port and an exhaust port on the cylinder head 11 opened and closed by intake valve 73 and exhaust valve 74.

The operation of the first embodiment is explained below. In operation, the engine 1 will start, the fuel is injected from the fuel injection nozzle 3 to the combustion space 22 of the pre-combustion chamber 21. Injected fuel from the fuel injection nozzle 3 is burned explosively in the pre-combustion chamber 21 and main combustion chamber 44. Exhaust gas produced in the combustion chambers 21 and 44 is exhausted to the outside of the engine 1 in the exhaust stroke. These cyclic operations are continued. In the initial operation, small holes of carbon trapper 321 do not fill with small carbon particles, so that the explosion gas will influence the heat insulating layer 32 of the fuel injection nozzle 3 through to the carbon trapper 321.

As the initial operation continues, exhaust gas conveys carbon particles to the carbon trapper 321, then an entrance to the carbon trapper 321 fills with carbon particles. Finally, the entrance of the carbon trapper 321' will be blocked with the carbon particles. The carbon trapper 321 seals the air in the heat insulating layer 32, so that the heat from the heat insulating cylinder 33 to the central cylinder 31 is blocked. Then the temperature of central cylinder is kept low. In the first embodiment, the carbon trapper 321 may not only be made from pressed silicon carbide fiber, but also may be made from porous ceramics, for example, aluminous porcelain. This structure can be applied to heat insulate the pre-combustion chamber 21 and the piston 2. For this purpose, heat insulation 221 and 222 are provided as shown in FIG. 1. The porosity of the heat insulation 222 is greater than that of the heat insulation 221.

Figure 4:
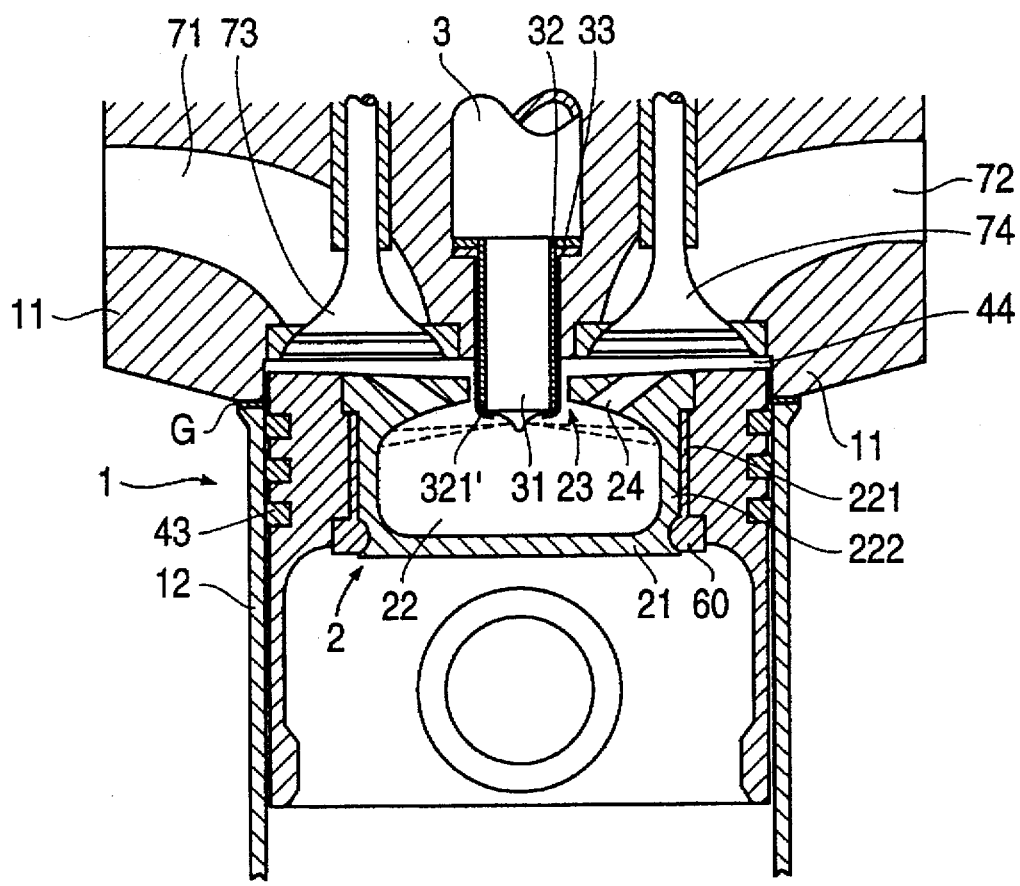
FIG. 4 is a cross section view of the pre-combustion chamber of a second embodiment of the present invention.
Figure 5:
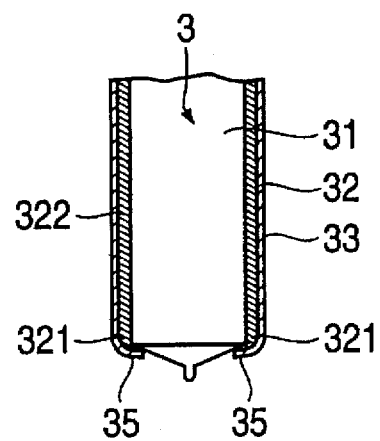
FIG. 5 is the enlarged cross section view of a top portion of the injection nozzle of the second embodiment.

The second embodiment of the present invention will be described in more detail. FIG. 4 is a cross sectional view of the pre-combustion chamber of the second embodiment of the present invention and FIG. 5 is the enlarged cross sectional view of a top portion of an injection nozzle of the second embodiment. In the second embodiment, the heat insulating layer 32 is filled with porous ceramics or pressed permeable ceramics fiber. The porosity of a heat insulation 321 is greater than that of a heat insulation 322. Then, the effect of heat insulation will be more improved. In the second embodiment, heat insulating layer 32 has no spacer, because, heat insulation 322 is substituted for the spacer. The heat insulation 321 and 322, which include the carbon trapper, are made from porous ceramics and unified. Undoubtedly, the porosity of the heat insulation will gradually changed thick to thin from 321 to 322. In the second embodiment, the same reference numerals of the first embodiment are used in FIGS. 4 and 5 to denote the same parts, and explanation of these parts is omitted. And the explanation of the operation of second embodiment is omitted because of the operation of the second embodiment is the same as first embodiment.

Figure 6:
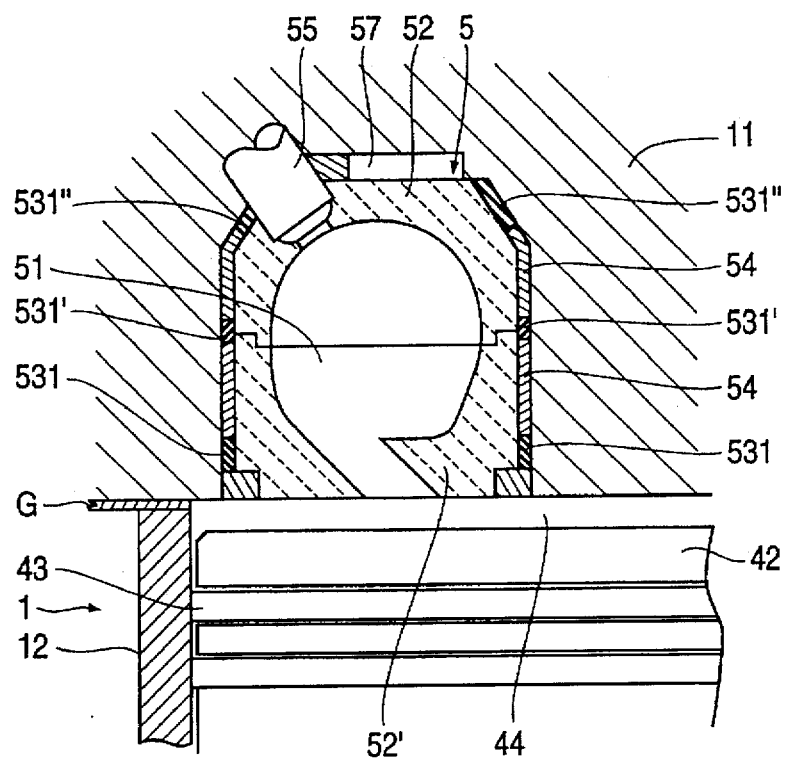
FIG. 6 is a cross section view of the pre-combustion chamber of a third embodiment of the present invention.

The third embodiment of the present invention will now be described in more detail. FIG. 6 shows a cross sectional view of the pre-combustion chamber of the third embodiment of the present invention. Numeral 12 denotes a cylinder liner of the engine 1, the piston 42 having the piston rings 43 is slidably fitted in the cylinder liner 12. Pre-combustion chamber 5 is provided in the cylinder head 11. Numeral 44 denotes a main combustion chamber.

Pre-combustion chamber 5 is constructed from upper cup 52 and lower cup 52' made from silicon nitride ceramics. The pre-combustion chamber 5 has a combustion space 51 surrounded by the upper cup 52 and lower cup 52'. For keeping the high temperature of the wall, a heat insulation layer by the air layer is prepared between the pre-combustion chamber 5 and cylinder head 11. A pressed permeable carbon trapper (heat insulation) 531 made from silicon nitride is inserted in the lowest part of the heat insulation layer. A pressed permeable carbon trapper 531' made from silicon nitride is used in the vicinity of a joint between the upper cup 52 and lower cup 52'. A pressed heat insulation (carbon trapper) 531" made from silicon nitride is inserted in the highest part of the heat insulation layer. Heat insulator 54 is formed between carbon trappers 531 and 531'. The porosities of the carbon trappers 531 and 531' are greater than that of the heat insulator 54. Numeral 55 denotes a heat insulation layer by the air layer prepared among the pre-combustion chamber 5 and cylinder head 11.

In the third embodiment, heat insulator 54 and heat insulation 531' and 531" include the carbon trapper will make from porous ceramics for example aluminous porcelain and unification. Undoubtedly, the porosity of the heat insulation will gradually change from thick to thin from 531' and 531" to 54.

The operation of the third embodiment is explained as below. In the operation, the engine 1 will start, the fuel is injected from the fuel injection nozzle 3 to the combustion space 51 of the pre-combustion chamber 5. Injected fuel from the fuel injection nozzle 3 is burned explosively in the pre-combustion chamber 5 and main combustion chamber 44. Exhaust gas produced in the combustion chamber 5 and 44 is exhausted to the outside of the engine 1 in the exhaust stroke. These cyclic operations are continued. In initial operation, small holes of carbon trappers 531 and 531' do not fill with small carbon particles, so that the explosion gas will influence the heat insulation 54.

As the initial operation continues for a while, exhaust gas conveys carbon particles to the carbon trappers 531 and 531', then an entrance to the carbon traps 531 and 531' will fill with carbon particles. Finally, the entrance of the carbon traps will be interrupted with the carbon particles. The carbon traps 531 and 531' seal the air in the heat insulation 54 so that the heat from the pre-combustion chamber 5 to the cylinder 11 is blocked. Then the temperature of the pre-combustion chamber 5 is kept high. In the third embodiment, the heat insulation 54 is from air gaps without insulation materials.

Figure 8:
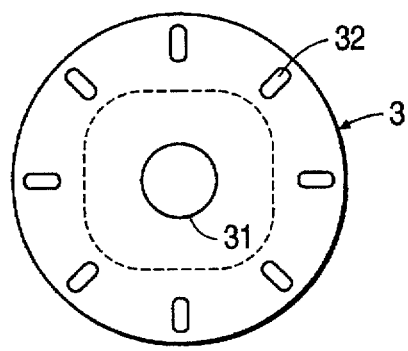
FIG. 8 is a plane view of an upper portion of the piston of the fourth embodiment of the present invention.
Figure 7:
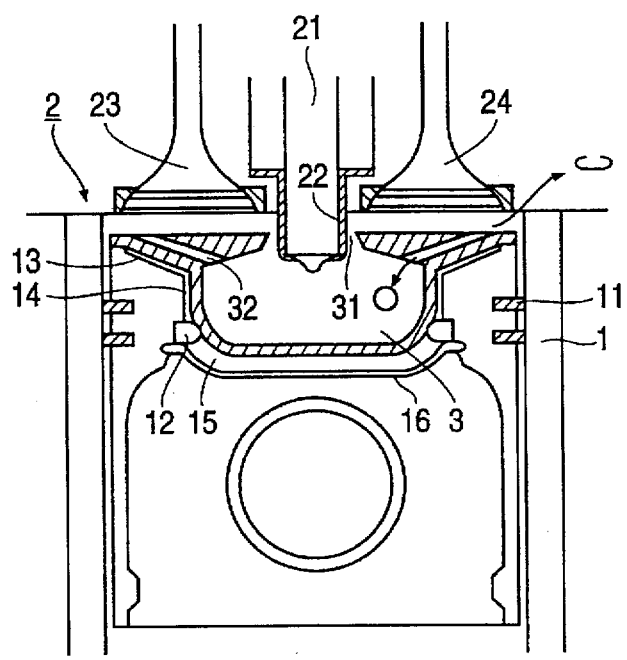
FIG. 7 is a cross section view of the pre-combustion chamber of a fourth embodiment of the present invention.

The 4th embodiment of the present invention will now be described in more detail. FIG. 7 is a cross section view of the pre-combustion chamber of the 4th embodiment of the present invention. FIG. 8 is a plane view of an upper portion of the piston of the 4th embodiment of the present invention. Numeral 12 denotes a cylinder liner of the engine 1. The piston having piston rings 43 is slidably fitted in the cylinder liner 12. The pre-combustion chamber 21 is embedded in a center region of the top of the piston 2 and made of a highly rigid, heat-resistant composite material such as silicon nitride or aluminum nitride, and an aluminum base. The pre-combustion chamber 21 has a central through hole 23 provided in the uppermost part thereof for accepting a fuel injection nozzle 31 mounted to the cylinder head 11. The pre-combustion chamber has a plurality of radial gas through holes 24 therein extending radially and upwardly towards the inner wall of the cylinder liner 12. The side wall opening 24a of the radial gas through holes 24 has a round shape in cross section but its upper opening end 24b has the shape of an elongated circle, as shown in FIG. 8. More particularly, the midway size of the elongated circle at the opening end is substantially equal to or smaller by up to 80% than that of the round shape. Numeral 22 denotes a combustion space of the pre-combustion chamber 21. Also, the radial gas through holes 24 extend in a spiral about the vertical axis of the cylinder liner 12 so that swirls of flame and unignited fuel gas are generated along the inner wall of the cylinder liner 12 after leaving the radial gas through holes 24 of the pre-combustion chamber 21. The pre-combustion chamber 21 is fixedly mounted by a retaining ring 60 to the piston 2. There are also provided a heat shielding material 222 made from ceramics fiber and close stitched material 221 in the clearance between the pre-combustion chamber 21 and the piston 2. A lower cover 62 is coupled through a heat shielding air clearance 61 to the bottom of the pre-combustion chamber 21.

Numerals 71 and 72 denote an inlet port and an exhaust port composed on the cylinder head 11 which are opened and closed by intake valve 73 and exhaust valve 74. For the purpose of preventing an increase in the temperature, a central cylinder 31 of the fuel injection nozzle 3, which includes a needle and a fuel path, has a heat insulating layer 32 formed from an air gap between the central cylinder 31 and the heat insulating cylinder 33, which is formed of metal. The surface of the heat insulating cylinder 33 is coated with zirconia ceramics. The top of the heat insulating cylinder 33 is fixed to the fuel injection nozzle 3 with a gasket made from the same material as the fuel injection nozzle 3 and/or the heat insulating cylinder 33.

The feature of the 4th embodiment of present invention is to provide a special figure of pre-combustion chamber 21 covered on the head of piston 2. Therefore, the radial gas through holes 24 open to the main combustion chamber close position to the cylinder 12. Furthermore, the feature of the 4th embodiment of present invention is to provide a heat shielding material 222 made from ceramics fiber, and close stitched material 221 in the clearance between the pre-combustion chamber 21 and the piston 2 for the heat insulation. The operation and effect of the 4th embodiment is the same as that of the first and second embodiments.

The operation of the 4th embodiment of present invention will now be explained. When the piston 2 moves upwards in the cylinder liner 12, towards the limit of compression stroke, with the central through hole 23 of the pre-combustion chamber 21 being almost closed by the injection nozzle 3, compressed air in the pre-combustion chamber 21 causes the inner wall of the pre-combustion chamber 21 to increase rapidly forming a heat layer thereon.

More specifically, since the material of the pre-combustion chamber 21 is very low in thermal conductivity, the combustion process allows a thin film of high-temperature heat to develop along the inner wall of the pre-combustion chamber 21.

Then, fuel introduced from the injection nozzle 3 into the pre-combustion chamber 21 ignites upon reaching the high thin film on the inner wall and compressed air in the pre-combustion chamber 21 carrying a high compression heat. When the central through hole 23 of the pre-combustion chamber 21 is almost closed with the piston 2 reaching its upper dead center point, a mixture of flame and unignited fuel gas, which has an increased volume from the ignition is instantaneously passed through the radial gas through holes 24 and blown out in all directions against the inner wall of the cylinder liner 12.

The mixture of flame and unignited fuel gas is distributed to every corner of the cylinder liner 12 due to the outwardly extending, elongated circle shaped openings 24b of the radial gas through holes 24. At the same time, the spiral configuration of the radial gas through holes 24 about the vertical axis of the piston 2 allows swirls of the mixture to be generated in the main combustion chamber 44, in a space between the upper face of the piston 2 and the inner wall of the cylinder liner 12 and between the lower face of cylinder head 11 and the inner wall of the cylinder liner 12. The fame and unignited fuel gas are thus mixed with air favorably and burnt drastically in the main combustion chamber 44. This creates a high pressure which in turn presses down the piston 2 to run the engine 1.

As set forth above, the 4th embodiment of the prevent invention provides a pre-combustion chamber having the multiple radial gas through holes as well as the center through hole and embedded in the top of the piston in combination with the fuel injection nozzle on the cylinder accepted in the central through hole. This allows the head of the cylinder to be constructed in a simple arrangement. Also, the radial gas through hole of the pre-combustion chamber extend from the center to the inner wall of the cylinder liner, allowing a mixture of flame and fuel gas produced in the pre-combustion chamber to be readily distributed to every corner of the cylinder liner and thus burnt at a higher efficiency.

It is understood that the present invention is not limited to the prescribed embodiment and various changes and modifications may be made without departing from the scope of the present invention as they reside in the present invention.

What is claimed is:

1. A heat generating internal combustion engine, comprising:
   a precombustion chamber;
   a heat insulation layer surrounding the precombustion chamber, the heat insulation layer being substantially enclosed, but having an entrance open to an exterior; and
   carbon trapping material provided at the entrance of the heat insulation layer, formed of a permeable material for trapping carbon particles as heat is generated in the internal combustion engine to thereby seal close the entrance of the heat insulation layer as heat is generated in the internal combustion engine.

2. A heat generating internal combustion engine according to claim 1, wherein the heat insulation layer is formed from an air gap between a main combustion chamber and outside walls and a pre-combustion chamber and outside walls.

3. A heat generating internal combustion engine according to claim 1, wherein
   the heat insulation layer is formed from a gap between a main combustion chamber and outside walls and between a pre-combustion chamber and outside walls,
   the gap contains air and insulating material, and
   the entrance is located where combustion gas can enter the heat insulation layer.

4. A heat generating internal combustion engine according to claim 3, wherein the insulating material and the carbon trapping material are made from a permeable ceramic fiber with the insulating material being less permeable than the carbon trapping material.

5. A heat generating internal combustion engine according to claim 3, wherein the insulating material and the carbon trapping material are made from porous ceramics with the insulating material being less permeable than the carbon trapping material.

6. A heat generating internal combustion engine according to claim 3, wherein the insulating material and the carbon trapping material are made from a unified porous ceramic with the porosity gradually changing from thick to thin from the carbon trapping material to the insulating material.

7. A heat generating internal combustion engine according to claim 1, further comprising a fuel injection nozzle having an insulating cylinder, wherein
   the heat insulation layer is formed from an air gap between a central cylinder and the insulating cylinder of the fuel injection nozzle, and
   the entrance is located where combustion gas can enter the heat insulation layer.

8. A heat generating internal combustion engine according to claim 1, further comprising a fuel injection nozzle having an insulating cylinder, wherein
   the heat insulation layer is formed from a gap between a central cylinder and the insulating cylinder of the fuel injection nozzle,
   the gap contains air and insulating material, and
   the entrance is located where combustion gas can enter the heat insulation layer.

9. A heat generating internal combustion engine according to claim 8, wherein the insulating material and the carbon trapping material are made from a permeable ceramic fiber with the insulating material being less permeable than the carbon trapping material.

10. A heat generating internal combustion engine according to claim 8, wherein the insulating material and the carbon trapping material are made from porous ceramics with the insulating material being less permeable than the carbon trapping material.

* * * * *